No. 691,395. Patented Jan. 21, 1902.
J. F. LOGUE & J. K. GANO.
WATER OUTLET FOR STEAM LINES.
(Application filed May 11, 1901.)
(No Model.)
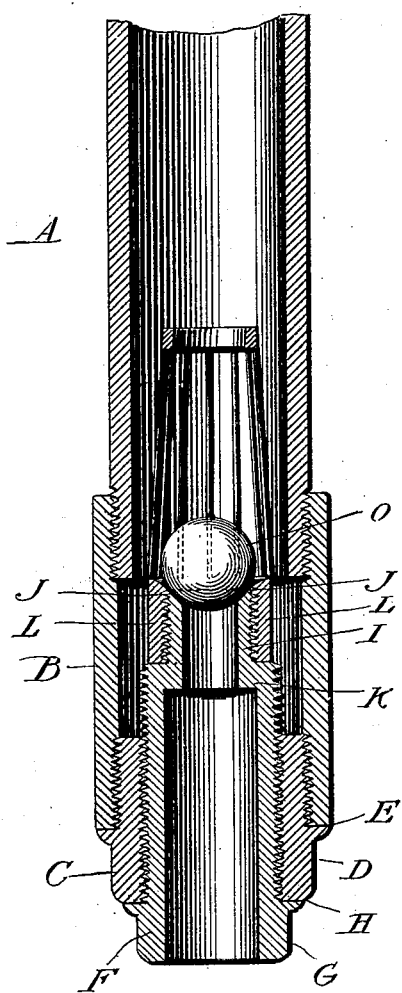
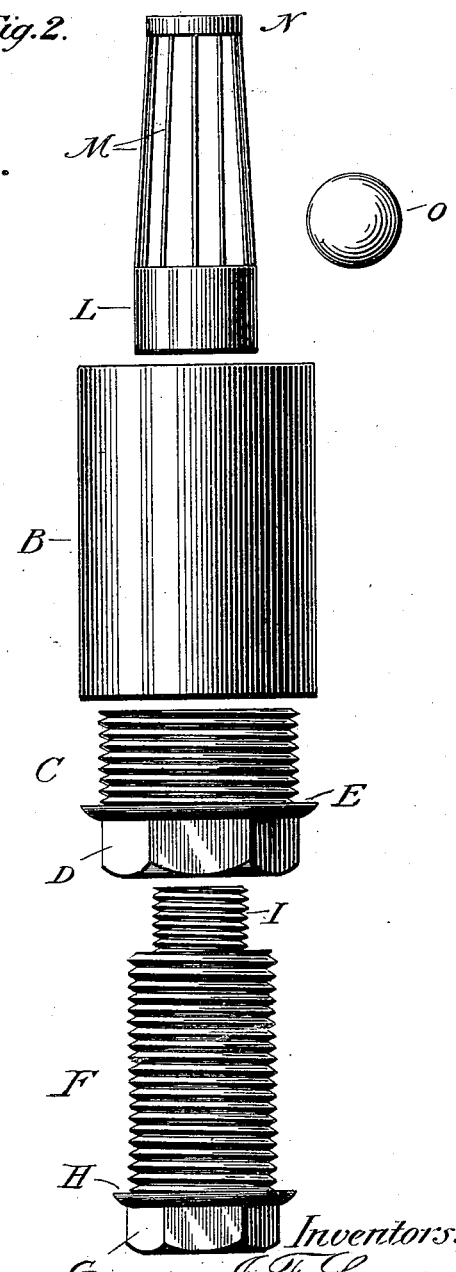
Witnesses:
A. M. Magruder.
M. C. Mayhew.
Inventors:
J. F. Logue,
J. K. Gano,
by O'Meara & Co.
Attys

UNITED STATES PATENT OFFICE.

JOHN FRANK LOGUE AND JOHN KYES GANO, OF GRIFFITH, OHIO.

WATER-OUTLET FOR STEAM-LINES.

SPECIFICATION forming part of Letters Patent No. 691,395, dated January 21, 1902.

Application filed May 11, 1901. Serial No. 59,869. (No model.)

*To all whom it may concern:*

Be it known that we, JOHN FRANK LOGUE and JOHN KYES GANO, citizens of the United States, residing at Griffith, in the county of Monroe and State of Ohio, have invented a new and useful Water-Outlet for Steam-Lines, of which the following is a specification.

This invention relates to improvements in valves, and particularly to drain or bleeder valves for steam-lines; and the object is to provide a simple and improved construction which may be readily used with any steam-lines.

A further object is to provide a simple construction of valve of this character which will operate automatically.

With the above objects in view the invention consists of the novel features of construction hereinafter fully described, particularly pointed out in the claim, and clearly illustrated by the accompanying drawings, in which—

Figure 1 is a longitudinal sectional view of a construction embodying my invention, the same being shown attached to a pipe forming part of a steam line system; and Fig. 2, a view of the parts detached.

Referring now more particularly to the accompanying drawings, A designates one of the pipes of the steam-line, having its end exteriorly screw-threaded to receive a coupling-sleeve B, which coupling-sleeve is interiorly threaded at its respective ends, the threads of one end coacting with the threads of the pipe A and the threads at the opposite end receiving an exteriorly-threaded bushing C, which is formed with an interiorly-screw-threaded bore and provided at its outer end with a wrench portion D and a shoulder E which abuts the end of the coupling-sleeve.

Threaded into the bushing C is the base member F of the valve-casing, the same being in the form of a sleeve exteriorly threaded to engage the threads of the bushing and formed with a wrench portion G and a shoulder H, abutting against the wrench portion D of the bushing. Said base member is formed at its opposite end with a reduced portion I, which is exteriorly screw-threaded and has at its outer end a beveled seat J. By reducing the base member to form said reducing portion I a shoulder K is formed at the inner end of said portion I.

Threaded upon the reduced portion I of the base member is a sleeve L, which forms part of the other member of the valve-casing, said member having at its outer end a cage formed of wires M, which are secured at their inner ends to the sleeve and at their outer ends to a collar or band N.

Wires M of the cage converge toward their outer ends, so that the cage is smaller at its outer than at its inner end. Movable within said cage is a ball O, which is prevented from displacement by the smaller end of the cage and which is adapted to contact with the seat J of the base member under pressure of steam from pipe A.

The operation of our invention is as follows: When there is no steam-pressure in pipe A, the ball automatically disengages the seat. When, however, steam is turned into said pipe, the water already in the pipe is driven outwardly by the steam and passes through the outlet end of the valve. As soon as the dry steam strikes the ball the latter is forced to its seat, making a perfectly-tight joint. Said ball remains seated until the steam-pressure is removed, when it again drops back into the cage and permits the water to pass out through the outlet end of the valve. Thus it will be seen that our valve acts automatically, so that a great amount of labor is saved, and also that the valve is more simple than those now in ordinary use and at the same time safer and cheaper.

While we have specifically set forth the construction which we prefer to use, yet we do not desire to limit ourselves to the exact details, as the same may be varied without departing from the spirit and scope of our invention.

Having thus fully described our invention, what we claim as new, and desire to secure by Letters Patent of the United States, is—

A device of the kind described comprising in combination a coupling-sleeve, internally threaded, the internally and externally threaded housing having a polygonal-shaped outer end, the externally-threaded base member having a polygonal-shaped outer end, the inner end being reduced and threaded and
5 formed with a seat at its end, a sleeve screwed upon the reduced end of the base member, the wire cage attached to the sleeve and the ball-valve contained therein and adapted to seat upon the seat end of the base member, substantially as described.

JOHN FRANK LOGUE.
JOHN KYES GANO.

Witnesses:
　WM. GODDARD,
　S. P. JACKSON.